(12) United States Patent
Moresve

(10) Patent No.: US 8,538,133 B2
(45) Date of Patent: Sep. 17, 2013

(54) SYSTEM FOR GUIDING A DRONE DURING THE APPROACH PHASE TO A PLATFORM, IN PARTICULAR A NAVAL PLATFORM, WITH A VIEW TO LANDING SAME

(75) Inventor: Julien Pierre Guillaume Moresve, Le Relecq-Kerhuon (FR)

(73) Assignee: DCNS, Paris (FR)

( * ) Notice: Subject to any disclaimer, the term of this patent is extended or adjusted under 35 U.S.C. 154(b) by 0 days.

(21) Appl. No.: 13/123,783

(22) PCT Filed: Oct. 13, 2009

(86) PCT No.: PCT/FR2009/051953
§ 371 (c)(1),
(2), (4) Date: Dec. 6, 2011

(87) PCT Pub. No.: WO2010/043815
PCT Pub. Date: Apr. 22, 2010

(65) Prior Publication Data
US 2012/0076397 A1    Mar. 29, 2012

(30) Foreign Application Priority Data
Oct. 13, 2008   (FR) ...................... 08 56929

(51) Int. Cl.
*G06K 9/00*   (2006.01)
(52) U.S. Cl.
USPC ....................................... 382/153

(58) Field of Classification Search
USPC .......................................... 382/106–107, 153
See application file for complete search history.

(56) References Cited

U.S. PATENT DOCUMENTS

| 3,704,070 A | 11/1972 | Johnson |
| 3,885,876 A | 5/1975 | Konopka |
| 4,209,768 A | 6/1980 | Basov |
| 4,345,310 A | 8/1982 | Gautier |
| 4,385,354 A | 5/1983 | Hornfeld et al. |
| 5,287,104 A | 2/1994 | Shemwell |
| 6,239,725 B1 | 5/2001 | Bray |
| 8,265,808 B2 * | 9/2012 | Garrec et al. ................... 701/16 |

FOREIGN PATENT DOCUMENTS

WO    WO 2008/061307 A1 *   5/2008

* cited by examiner

*Primary Examiner* — Daniel Mariam
(74) *Attorney, Agent, or Firm* — McDermott Will & Emery LLP

(57) ABSTRACT

This system for guiding a drone during the approach phase to a platform, particularly a naval platform, with a view to landing the same, is characterized in that the platform is equipped with a glide slope indicator installation emitting an array of optical guide beams over an angular sector predetermined from the horizontal, and in that the drone is equipped with a beam acquisition camera connected to image analysis means and to computing means of orders for commanding automatic piloting means of the drone to cause it to follow the guide beams.

10 Claims, 2 Drawing Sheets

SYSTEM FOR GUIDING A DRONE DURING THE APPROACH PHASE TO A PLATFORM, IN PARTICULAR A NAVAL PLATFORM, WITH A VIEW TO LANDING SAME

CROSS REFERENCE TO PRIOR APPLICATIONS

This application is a U.S. National Phase application under 35 U.S.C. §371 of International Application No. PCT/FR2009/051953, filed on Oct. 13, 2009 and claims benefit of priority to French Patent Application No. 0856929, filed on Oct. 13, 2008. The International Application was published in French on Apr. 22, 2010 as WO 2010/043815 A1 under PCT Article 21(2). All of these applications are herein incorporated by reference.

The present invention relates to a system for guiding a drone during the approach phase to a platform.

More particularly, the invention concerns a system for guiding said drone during the approach phase to a platform e.g. a naval platform in particular, with a view to landing this drone.

It is known that this problem relating to guiding is a crucial problem which has given rise to developments for many years now.

Guiding solutions for this type of application, which use GPS or radar technology, have already been proposed.

However, for the particular application to a naval platform these systems require the controlling of this platform, and in particular require knowledge of the motions and equipment thereof.

Another difficulty added to these problems to guarantee retrieval of the drone relates to the fact that the position of this drone is often measured by GPS whose availability is not guaranteed at every moment in time on account of constellation cycle slips, multi-pathways, interference, etc.

It is the objective of the invention to solve these problems.

For this purpose, the subject of the invention is a system for guiding a drone during the approach phase to a platform, in particular a naval platform, to cause it to land on this platform, characterized in that the platform is equipped with a glide slope indicator installation emitting an array of optical guide beams onto an angular sector predetermined from the horizontal, and in that the drone is equipped with a beam acquisition camera connected to image analysis means and to means computing orders for the commanding of automatic flight means of the drone, in order to cause the drone to follow the guide beams.

According to other aspects of the invention, the guiding system comprises one or more of the following characteristics:
the array of guide beams comprises three beams of different colours juxtaposed in elevation from the horizontal,
the colour of the first beam is red, the colour of the second beam is green and the colour of the third beam is yellow,
the first beam has a beam elevation angle of 4°, the second beam of 2° and the third of 8°,
the beams have a beam azimuth angle of 30°,
the azimuth angle of the beams is divided into a first port-side angular sector of 27° and a second angular sector of 3° starboard from the first port-side sector,
in the first port-side angular sector the red beam flashes with a period of 1 second, the green beam does not flash and the yellow beam flashes with a period of 2 seconds, whilst in the second angular starboard sector all the beams flash with a period of 0.5 second,
the image analysis means are adapted to deliver to the computing means information on beam colour and information on sector determined from the flashing period thereof, perceived by the camera, and the means for computing orders to command the automatic piloting means of the drone are adapted to determine the longitudinal $V_x$, lateral $V_y$ and climb $V_z$ velocities thereof as per the following equations:
  if the colour of the perceived beam is red then $V_x = V_{cruise} \ast 0.22$ and $V_z = V_{zmax}$, $V_{cruise}$ being the cruise velocity of the drone and $V_{zmax}$ being its maximum rate-of-climb, these velocities being predetermined in m/s;
  if the colour of the perceived beam is green, then $V_x = V_{cruise} \ast \frac{3}{5}$ and $V_z = V_{zmax}$;
  if the colour of the perceived beam is yellow, then $V_x = V_{cruise} \ast 35$ and $V_z = -V_{zmax}$, and
  if no beam is perceived, then $V_x = 0$ and $V_z = -V_{zmax}$, and
  if the perceived sector is the first port-side sector, then $V_y = -2$;
  if the perceived sector is the second starboard sector, then $V_y = 7$, and
  if no sector is perceived, then $V_y = 0$
the computing means are adapted to take into account the travel rate of the platform, and
the platform is a surface vessel and the glide slope indicator installation equipment is roll and pitch stabilised on this vessel.

The invention will be better understood with the help of the following description given solely as an example and with reference to the appended drawings in which:

FIG. 1 illustrates a system for guiding a drone during the approach phase to a platform, in particular a naval platform.

This platform is given the general reference 1 in this figure, and towards the aft for example it comprises a landing area for the drone.

This platform is in fact equipped with an installation indicating the glide slope and emits an array of optical guide beams over an angular sector predetermined from the horizontal.

For its part, the drone is equipped with a beam acquisition camera connected to image analysis means and to means computing orders for commanding of automatic piloting means of this drone, to cause it to follow the guide beams.

Figure 1:
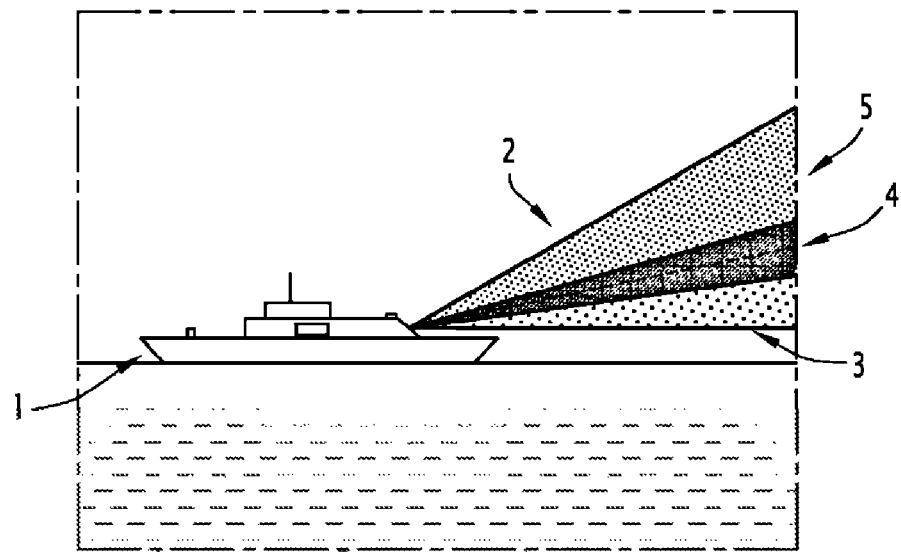
FIG. 1 illustrates a naval platform equipped with a glide slope indicator installation that is a constituent part of a guiding system according to the invention.

In this FIG. 1, the array of optical guide beams carries the general reference 2.

The array of guide beams may comprise three beams of different colours juxtaposed in elevation from the horizontal, such as the beams designated with the respective reference numbers 3, 4, 5 in this FIG. 1.

The colour of the first beam 3 may be red, the colour of the second beam 4 green and the colour of the third beam 5 yellow.

In addition, the first beam may have a beam elevation angle of 4°, the second of 2° and the third of 8°.

These beams may also have a beam azimuth angle of 30°, this azimuth angle being divided into a first port-side angular sector of 27° and a second angular sector 3° starboard from the first port-side sector.

Also, in the different sectors thus defined, the beams can also flash with different periods.

For example, in the first angular port-side sector the red beam may flash with a period of 1 second, the green beam does not flash, whilst the yellow beam may flash with a period of 2 seconds.

In the second angular starboard sector, all the beams flash with a period of 0.5 second.

Figure 2:
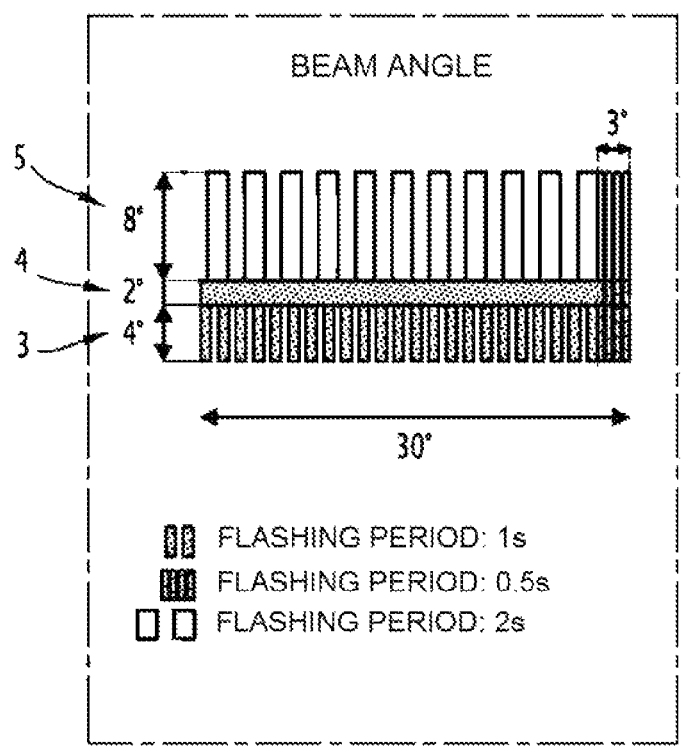
FIG. 2 illustrates an array of optical beams emitted by said installation.

This is schematized in FIG. 2 where the first, second and third beams 3, 4 and 5 can be seen of red, green and yellow colour respectively.

This FIG. 2 also illustrates the azimuth angle of 30° of these beams, with the first sector of 27° and the second sector of 3°.

Figure 3:
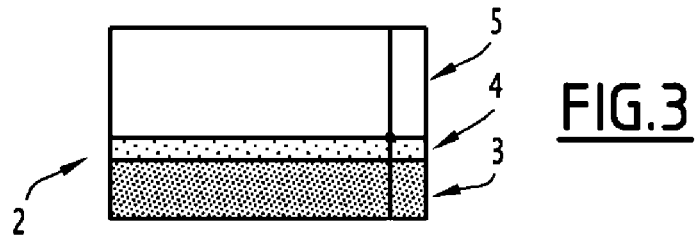
FIGS. 3, 4 and 5 illustrate the ideal trajectory to be followed by a drone when being guided.
Figure 4:
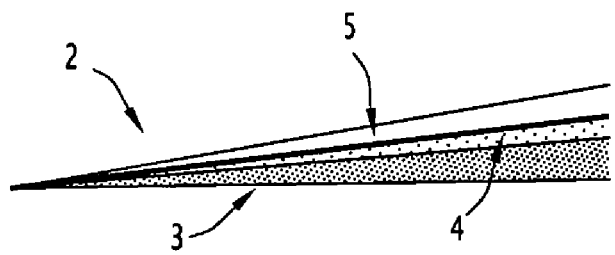
Figure 5:
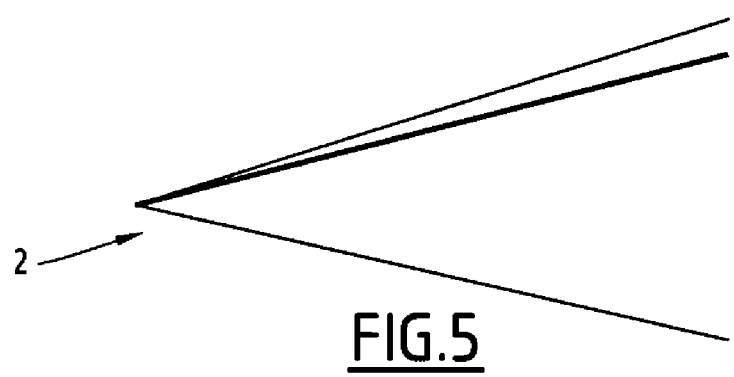

It can therefore be understood, as is illustrated FIGS. 3, 4 and 5, that it is possible to define an ideal trajectory for the drone when approaching the platform, by causing it to follow a course such as illustrated by the bolder line in these figures at the junction between the port-side and starboard sectors of the second and third optical beams.

Figure 6:
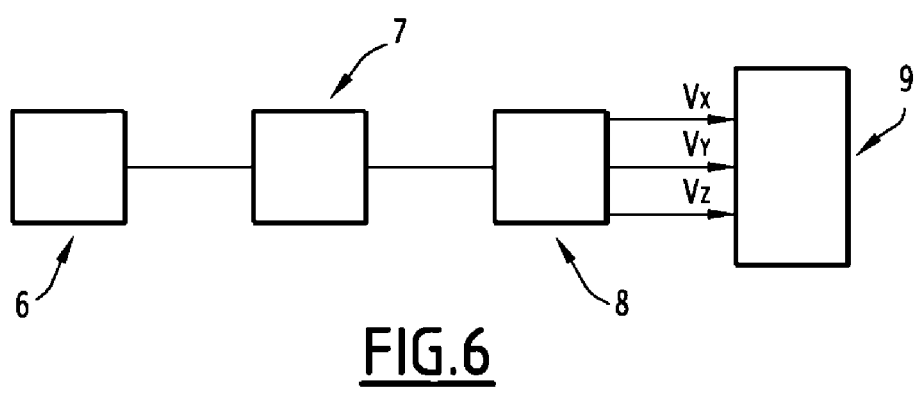
FIG. 6 is a summary schematic illustrating different means integrated in a drone to ensure this tracking.

For this purpose the drone is equipped, as illustrated FIG. 6, with a beam acquisition camera generally denoted 6 in this figure, whose output is connected to image analysis means carrying the general reference 7.

These analysis means are themselves connected to means computing orders for the commanding of automatic piloting means of the drone, so as to cause it to follow the guide beams, the means for computing orders carrying the general reference number 8 and the automatic piloting means of the drone carrying the general reference number 9.

It will therefore be understood that this chain allows the image analysis means to deliver beam colour information to the computing means and sector information determined from the flashing period thereof such as perceived by the camera, so that the means for computing orders commanding the automatic piloting means of the drone determine longitudinal Va, lateral Vy and climb Vz velocities for this drone.

The computing algorithm for these different velocities can then be the following:

If the colour of the perceived beam is red, then Vx=Vcruise*0.22 and Vz=Vzmax, Vcruise being the cruise velocity of the drone and Vzmax its maximum rate-of-climb, these velocities being predetermined in metres/second for example by the drone manufacturer.

On the other hand, if the perceived colour of the beam is green, then Vx=Vcruise*⅗ and Vz=Vzmax.

Finally, if the perceived colour of the beam is yellow, then Vx=Vcruise*⅗ and Vz=−Vzmax.

On the other hand, if no beam is perceived, then Vx=0 and Vz=−Vzmax.

Similarly, if the perceived sector is the first port side sector, then Vy=−2 and if the perceived sector is the second starboard side sector, then Vy=7.

If no sector is perceived, then Vy is set at 0.

It can therefore be understood that these piloting orders allow the drone more or less accurately to follow the ideal trajectory such as previously defined.

It will also be noted that if the platform is a vessel such as a surface vessel, the glide slope indicator installation is pitch and roll stabilized in conventional manner.

Similarly, the computing means can be adapted to take into account the rate of travel of the platform for further improved accurate following of the trajectory.

It can therefore be appreciated that, with said system, these means allow the flashing of the glide slope indicator to be observed via the drone camera, and subsequent orders to be given to the drone concerning longitudinal and lateral velocities so that it follows the frequency transition zone of this glide slope indicator as a path of descent from which it must not deviate.

The determined trajectory can then be likened to that of a helicopter during the approach phase so that the visual safety controls are identical for the aviation officer on board the platform for example.

Said system is therefore fully optical and allows a drone to be retrieved in an area in which the GPS signal may possibly be deliberately jammed or made unavailable in some way or another, over the optical range of said glide slope indicator.

In the event of definitive loss of connection between the platform and the drone or in the event of GPS interference, and if the drone is travelling outside the optical range, the platform can be moved to locate the drone by emitting the array of beams in its estimated direction.

If the glide slope indicator installation is pitch and roll stabilised, the trajectory of this drone is also independent of the roll and pitch of the platform, and by following the descent path the drone makes up for the yaw motion of the vessel.

In general, it can be estimated that the ideal glide slope can be set at 4°.

This system therefore allows a drone to be guided from a contact point of fixed altitude and far behind the platform, inasmuch as the glide slope indicator installation may have a range of 1.5 NM, as for as a point where the drone is taken in charge by a precision short range landing sensor.

With said installation it is also possible to retrieve the drone without any link as a radiofrequency link.

It is also to be noted that a significant improvement in the precision of guiding can also be provided when the computing means take into account the rate of travel of the platform.

In this case, the error in relation to the optimum guide path is then more stable.

This makes it possible to reduce the time of landing procedure since the drone follows a much more direct pathway and there are fewer drone oscillations around this guide path.

In fact, it is also to be noted that the acquisition and processing frequency of the array of beams plays a very important role in the precision of guiding.

Simulations have validated the guiding of a drone up to a distance of 20 metres aft of a frigate with force 5 sea conditions and stern sea of 45°, the drone approaching at more than 5 metres per second.

It can therefore be appreciated that this system exhibits a certain number of advantages compared with structures already known in the state of the art.

Evidently, although the described example of embodiment concerns the positioning of an installation of this type onboard a naval platform, the system of the invention can also be applied to any landing platform, and the glide slope indicator installation can also be formed of a mobile module able to be installed provisionally and temporarily on a naval platform or on any other platform such as a land-based landing platform.

The invention claimed is:

1. A system for guiding a drone during the approach phase to a platform in particular a naval platform (1) with a view to landing the same, characterized in that the platform is equipped with a glide slope indicator installation emitting an array (2) of optical guide beams over an angular sector predetermined from the horizontal, and in that the drone is equipped with a beam acquisition camera (6) connected to image analysis means (7) and to computing means (8) of orders for the commanding of automatic piloting means (9) of the drone, to cause it to follow the guide beams.

2. The system for guiding a drone during the approach phase to a platform, particularly a naval platform, with a view to landing the same according to claim 1, characterized in that the array of guiding beams comprises three beams (3, 4, 5) of different colours juxtaposed in elevation from the horizontal.

3. The system for guiding a drone during the approach phase to a platform, particularly a naval platform, with a view to landing the same according to claim 2, characterized in that the colour of the first beam (3) is red, the colour of the second beam (4) is green and the colour of the third beam (5) is yellow.

4. The system for guiding a drone during the approach phase to a platform, particularly a naval platform, with a view to landing the same according to claim 2 or 3, characterized in that the first beam (3) has a beam elevation angle of 4°, the second (4) of 2° and the third (5) of 8°.

5. The system for guiding a drone during the approach phase to a platform, particularly a naval platform, with a view to landing the same according to claim 2, 3 or 4 characterized in that the beams have a beam azimuth angle of 30°.

6. The system for guiding a drone during the approach phase to a platform, particularly a naval platform, with a view to landing the same according to claim 5, characterized in that the azimuth angle of the beams is divided into a first port-side angular sector of 27° and a second angular sector 3° starboard from the first port-side sector.

7. The system for guiding a drone during the approach phase to a platform, particularly a naval platform, with a view to landing the same according to claim 6, characterized in that in the first port-side angular sector the red beam (3) flashes with a period of 1 second, the green beam (4) does not flash and the yellow beam (5) flashes with a period of 2 seconds, whilst in the second starboard angular sector all the beams (3, 4, 5) flash with a period of 0.5 second.

8. The system for guiding a drone during the approach phase to a platform, particularly a naval platform, with a view to landing the same according to claim 7 characterized in that the image analysis means (7) are configured to deliver to the computing means (8) information on beam colour and information on sector determined from the flashing period thereof perceived by the camera (6), and in that the means (8) computing orders for commanding the automatic piloting means of the drone are configured to determine the longitudinal $V_x$, lateral $V_y$ and climb $V_z$ velocities thereof, as per the following:

if the colour of the perceived beam is red then $V_x = V_{cruise}*0.22$ and $V_z = V_{zmax}$, Vcruise being the cruise velocity of the drone and Vzmax its maximum rate-of-climb, these velocities being predetermined in m/s:

if the colour of the perceived beam is green then $V_x = V_{cruise}*3/5$ and $V_z = V_{zmax}$ if the colour of the perceived beam is yellow then $V_x = V_{cruise}*3/5$ and $V_z = -V_{zmax}$, and if no beam is perceived then $V_x = 0$ and $V_z = -V_{zmax}$ and, if the perceived sector is the first port-side sector, then $V_y = -2$ if the perceived sector is the second starboard sector, then $V_y = 7$, and if no sector is perceived, then $V_y = 0$.

9. The system for guiding a drone during the approach phase to a platform, particularly a naval platform, with a view to landing the same according to claim 8, characterized in that the computing means (8) are configured to take into account the rate of travel of the platform.

10. The system for guiding a drone during the approach phase to a platform, particularly a naval platform, with a view to landing the same according to any of the preceding claims, characterized in that the platform is a surface vessel (1) and in that the glide slope indicator installation is pitch and roll stabilised on this vessel.

\* \* \* \* \*